(12) United States Patent
Nakaoka

(10) Patent No.: US 10,618,505 B2
(45) Date of Patent: Apr. 14, 2020

(54) ELECTRIC BRAKE SYSTEM AND METHOD OF SETTING PRESSING FORCE-CURRENT CHARACTERISTICS

(71) Applicant: TOYOTA JIDOSHA KABUSHIKI KAISHA, Toyota-shi, Aichi-ken (JP)

(72) Inventor: Hiroshi Nakaoka, Okazaki (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 218 days.

(21) Appl. No.: 15/827,257

(22) Filed: Nov. 30, 2017

(65) Prior Publication Data

US 2018/0162333 A1 Jun. 14, 2018

(30) Foreign Application Priority Data

Dec. 13, 2016 (JP) ................. 2016-241400

(51) Int. Cl.
| | |
|---|---|
| B60T 8/17 | (2006.01) |
| F16D 65/18 | (2006.01) |
| B60T 8/00 | (2006.01) |
| F16D 55/226 | (2006.01) |
| B60T 13/58 | (2006.01) |
| B60T 13/74 | (2006.01) |
| F16D 121/24 | (2012.01) |
| F16D 125/40 | (2012.01) |
| H02P 15/00 | (2006.01) |

(52) U.S. Cl.
CPC ............. *B60T 8/17* (2013.01); *B60T 8/00* (2013.01); *B60T 13/588* (2013.01); *B60T 13/741* (2013.01); *B60T 13/746* (2013.01); *F16D 55/226* (2013.01); *F16D 65/18* (2013.01); *F16D 65/183* (2013.01); *H02P 15/00* (2013.01); *F16D 2121/24* (2013.01); *F16D 2125/40* (2013.01)

(58) Field of Classification Search
None
See application file for complete search history.

(56) References Cited

U.S. PATENT DOCUMENTS

| | | | |
|---|---|---|---|
| 9,643,586 B2* | 5/2017 | Blattert | B60T 7/122 |
| 9,956,947 B2* | 5/2018 | Nishikawa | B60T 13/741 |
| 2014/0196994 A1* | 7/2014 | Schneider | B60T 13/588 |
| | | | 188/152 |

FOREIGN PATENT DOCUMENTS

| | | |
|---|---|---|
| JP | 2000267712 A | 9/2000 |
| JP | 2003-106355 A | 4/2003 |
| JP | 2009115313 A | 5/2009 |
| JP | 2010-036640 A | 2/2010 |
| JP | 2010-070143 A | 4/2010 |
| JP | 2012106626 A | 6/2012 |

* cited by examiner

*Primary Examiner* — Lail A Kleinman
(74) *Attorney, Agent, or Firm* — Sughrue Mion, PLLC

(57) ABSTRACT

A current whose magnitude corresponds to first pressing force-current characteristics set to prevent forward movement of a driven member from being stopped is applied to a motor when the driven member moves forward, and a current whose magnitude corresponds to second pressing force-current characteristics set to move the stopped driven member forward is applied to the motor when the driven member is stopped, in the case where a relationship between a pressing force as a force with which a friction member presses a rotating body and an energization current to the motor is defined as pressing force-current characteristics.

10 Claims, 7 Drawing Sheets

ELECTRIC BRAKE SYSTEM AND METHOD OF SETTING PRESSING FORCE-CURRENT CHARACTERISTICS

INCORPORATION BY REFERENCE

The disclosure of Japanese Patent Application No. 2016-241400 filed on Dec. 13, 2016 including the specification, drawings and abstract is incorporated herein by reference in its entirety.

BACKGROUND

1. Technical Field

The disclosure relates to an electric brake system and to a method of setting pressing force-current characteristics. Specifically, the disclosure relates to an electric brake system equipped with an electric brake device that is provided in a wheel, and to a method of setting pressing force-current characteristics for use in the control of the electric brake system.

2. Description of Related Art

In each of Japanese Patent Application Publication No. 2010-70143 (JP 2010-70143 A), Japanese Patent Application Publication No. 2010-36640 (JP 2010-36640 A), and Japanese Patent Application Publication No. 2003-106355 (JP 2003-106355 A), an electric brake system that is equipped with an electric brake device is described. The electric brake device has (a) a friction member, (b) a rotating body that rotates together with a wheel, (c) a motor as a motive power source, and (d) a driven member that is moved forward-backward by the motor, and generates a braking force by pressing the friction member against the rotating body through forward movement of the driven member caused by the motor.

SUMMARY

The electric brake system described in each of Japanese Patent Application Publication No. 2010-70143 (JP 2010-70143 A), Japanese Patent Application Publication No. 2010-36640 (JP 2010-36640 A), and Japanese Patent Application Publication No. 2003-106355 (JP 2003-106355 A) is configured to control the energization current to the motor in consideration of a loss resulting from friction resistance that is generated until the force of the motor is transmitted to the friction member. However, a problem may arise in the accuracy of the considered loss when the difference between a static frictional force and a dynamic frictional force is large in the case where these frictional forces are generated until the force of the motor is transmitted to the friction member. The practicality of the electric brake system is considered to be enhanced by coping with the problem. An aspect of the disclosure provides a more practical electric brake system.

Besides, in the electric brake system according to the disclosure, pressing force-current characteristics as a relationship between a pressing force as a force with which the friction member presses the rotating body and the energization current are used. The characteristics are utilized to control the motor, and hence are preferred to be highly reliable. Another aspect of the disclosure provides a method of setting pressing force-current characteristics that makes it possible to acquire highly reliable pressing force-current characteristics.

An first aspect of the disclosure provides an electric brake system. The electric brake system includes: an electric brake device including a friction member, a rotating body that is configured to rotate together with a wheel, a motor as a motive power source, and a driven member that is driven by the motor, the electric brake device being configured to generate a braking force by pressing the friction member against the rotating body through forward movement of the driven member; and a control device configured to control the braking force that is generated by the electric brake device by controlling the motor. The control device is configured to, in a case where a relationship between a pressing force as a force with which the friction member presses the rotating body and an energization current to the motor is defined as pressing force-current characteristics, apply, to the motor, a current whose magnitude corresponds to first pressing force-current characteristics set to prevent forward movement of the driven member from being stopped when the driven member moves forward, and apply, to the motor, a current whose magnitude corresponds to second pressing force-current characteristics set to move the driven member in a stopped state forward when the driven member is stopped In the electric brake system according to the first aspect, the energization current to the motor is controlled through the use of the first pressing force-current characteristics that take dynamic friction into account, and the second pressing force-current characteristics that take static friction into account. Therefore, according to the electric brake system of the disclosure, when the stopped driven member is moved forward, a relatively large current that takes static friction into account is applied, and the responsiveness of a braking force to braking operation can be ensured. Besides, when the driven member moves forward, a current having a magnitude that does not stop the driven member through dynamic friction is applied, so the braking force can be reliably increased in accordance with braking operation. In consequence, according to the electric brake system according to the first aspect, both static friction and dynamic friction can be coped with through a simple method of changing over the characteristics for controlling the energization current to the motor, depending on whether or not the electric brake device actually operates inside.

In the first aspect, the control device may be configured to determine a target energization current as a target of the energization current to the motor, by summating a component of the energization current to the motor that is determined based on the first pressing force-current characteristics or the second pressing force-current characteristics and a component of the energization current to the motor for making the pressing force close to a target pressing force determined based on braking operation by a driver.

In the first aspect, the motor may be a rotary motor, and the electric brake device may have a decelerator configured to decelerate rotation of the motor, and a motion conversion mechanism configured to convert rotation of an output shaft of the decelerator into rectilinear motion and output the rectilinear motion to the driven member.

In the first aspect, the first pressing force-current characteristics may be set based on a plurality of first samples acquired during continuous forward movement of the driven member as a result of continuous increases in the energization current to the motor. Each of the plurality of the first samples may be a sample of the pressing force-current characteristics as a combination of the energization current and the pressing force corresponding to the energization current.

In the above aspect, the second pressing force-current characteristics may be set based on a plurality of second samples acquired with the pressing force assuming different values respectively and with the driven member stopped. Each of the plurality of the second samples may be a combination of the energization current of the motor acquired at a time point of start of forward movement of the driven member as a result of an increase in the energization current to the motor from the state where the driven member is stopped and the pressing force corresponding to the energization current.

In the first aspect, the control device may include a first characteristic setting unit configured to set the first pressing force-current characteristics, and a second characteristic setting unit configured to set the second pressing force-current characteristics.

In the above configuration, the first characteristic setting unit may be configured to acquire a plurality of first samples of the first pressing force-current characteristics as a combination of the energization current to the motor and the pressing force corresponding to the energization current while continuously increasing the energization current to the motor, and set the first pressing force-current characteristics based on the plurality of the first samples.

In the above configuration, the second characteristic setting unit may be configured to acquire an initial second sample of the second pressing force-current characteristics as a combination of the energization current to the motor and the pressing force corresponding to the energization current at a time point of start of forward movement of the driven member as a result of an increase in the energization current to the motor from the state where the driven member is stopped, after acquiring the initial second sample, acquire a plurality of second samples in which the pressing force assumes different values respectively with the driven member stopped, by repeatedly reducing the energization current to the motor and stopping the driven member, and set the second pressing force-current characteristics based on the initial second sample and the plurality of the second samples.

In the above configuration, the second characteristic setting unit may be configured to increase the energization current to the motor to a magnitude that is acquired based on the first pressing force-current characteristics for the pressing force at a time point of stop of the driven member after stop of the driven member, and then gradually increase the energization current to the motor.

Besides, a second aspect of the disclosure provides a method of setting pressing force-current characteristics. The method of setting the pressing force-current characteristics is characterized by including a first characteristic setting process that includes acquiring a plurality of first samples of the first pressing force-current characteristics as a combination of the energization current to the motor and the pressing force corresponding to the energization current while continuously increasing the energization current to the motor, and setting the first pressing force-current characteristics based on the plurality of the first samples; and a second characteristic setting process that includes acquiring an initial second sample of the second pressing force-current characteristics as a combination of the energization current to the motor and the pressing force corresponding to the energization current at a time point of start of forward movement of the driven member as a result of an increase in the energization current to the motor from the state where the driven member is stopped, acquiring a plurality of second samples in which the pressing force assumes different values respectively with the driven member stopped by repeatedly reducing the energization current to the motor and stopping the driven member, and setting the second pressing force-current characteristics based on the initial second sample and the plurality of the second samples. The second characteristic setting process includes increasing the energization current to the motor to a magnitude that is acquired based on the first pressing force-current characteristics for the pressing force at a time point of stop of the driven member immediately after stop of the driven member, and then gradually increasing the energization current to the motor.

Besides, the method of setting the pressing force-current characteristics according to the second aspect utilizes the first pressing force-current characteristics in setting the second pressing force-current characteristics, and thereby makes it possible to shorten the time in which the energization current to the motor is gradually increased and hence also to lessen the amount of rise in the pressing force while the energization current is gradually increased. In consequence, the method of setting the pressing force-current characteristics according to the disclosure makes it possible to increase the number of samples of the characteristics and to efficiently acquire highly reliable pressing force-current characteristics.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

As a mode for carrying out the disclosure, an embodiment of the disclosure will be described hereinafter in detail with reference to the drawings. Incidentally, the disclosure is not limited to the following embodiment thereof, but can be carried out in various modes subjected to various alterations and improvements based on the knowledge of those skilled in the art.

<Configuration of Electric Brake System>

An electric brake system according to the embodiment of the disclosure is configured to include electric brake devices 2 shown in FIG. 1 (hereinafter referred to simply as the brake devices 2 in some cases) that are provided in such a manner as to correspond to two or more of a plurality of wheels provided in a vehicle, and a brake ECU 4 as a control device that controls the brake devices 2. Each of the brake devices 2 is configured to include an electric brake 8 that has a motor 6 and that restrains the wheel from rotating through the driving of the motor 6, and a motor ECU 10 that controls the motor 6. The motor ECU 10 of each of the brake devices 2 and the brake ECU 4 are connected to each other by a car area network (a CAN) 12, and can communicate with each other.

Figure 1:
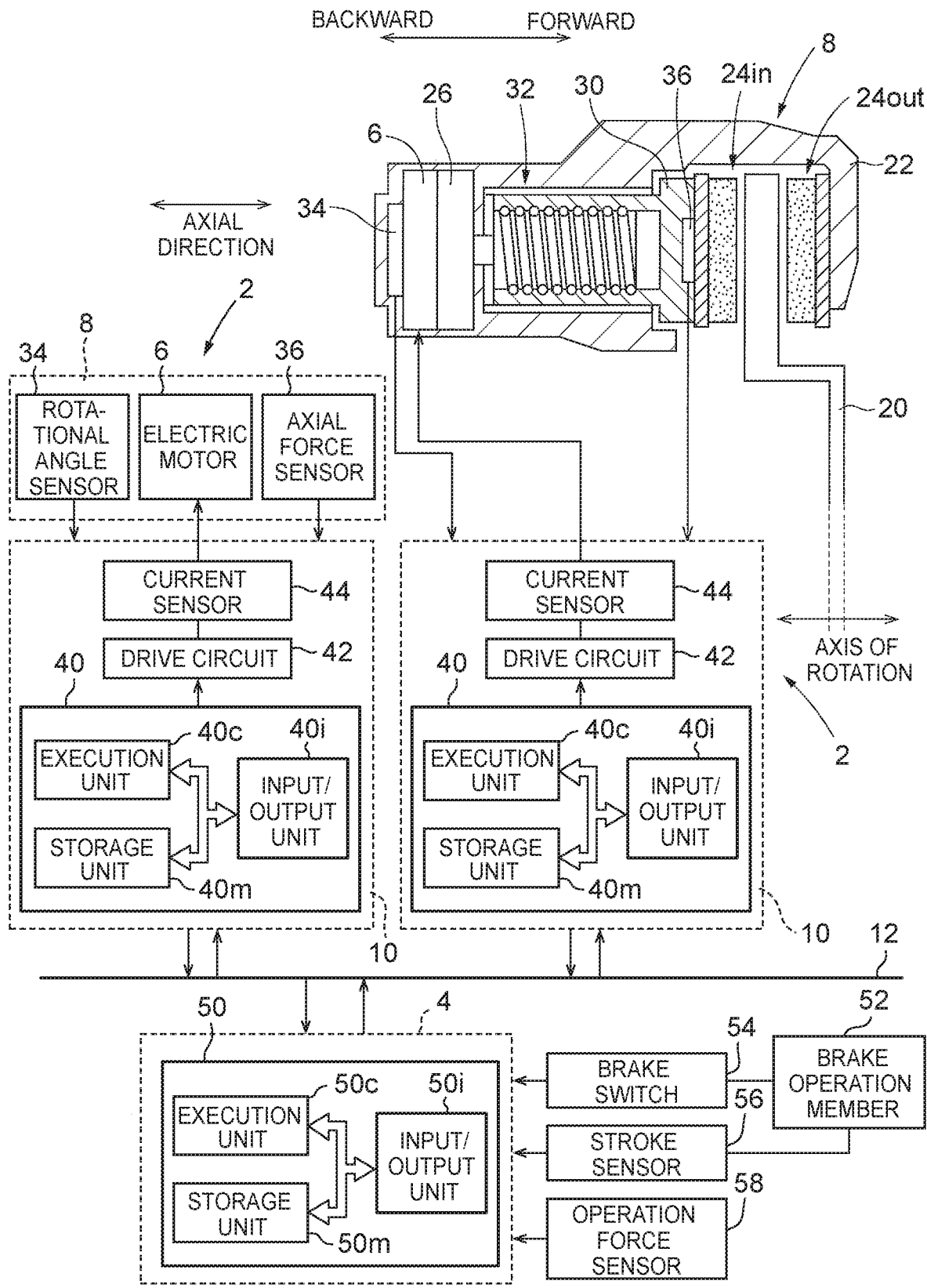
FIG. 1 is a conceptual view of a vehicular brake system according to the embodiment of the disclosure.

As shown in FIG. 1, the electric brake 8 is a disc brake, and is configured to include (a) a disc rotor 20 (hereinafter referred to simply as "the rotor 20" in some cases) as a rotating body that rotates integrally with the wheel, (b) a caliper 22 that is attached to a non-rotating body (not shown) of a vehicle body movably in a direction parallel to an axis of rotation of the wheel (hereinafter referred to as an axial direction) in such a state as to stride over the disc rotor 20, (c) a pair of brake pads 24in and 24out that are held by the non-rotating body movably in the axial direction and that are located inside and outside the rotor 20 respectively, (d) the motor 6 that is held inside the caliper 22, (e) a decelerator 26 that decelerates and outputs rotation of the motor 6, (f) a piston 30 that is held by the caliper 22 in a non-rotatable manner relatively thereto and movably in the axial direction, (g) a motion conversion mechanism 32 that converts rotation of an output shaft of the decelerator 26 into rectilinear motion and that outputs the rectilinear motion to the piston 30, and the like.

Besides, the electric brake 8 is configured to include a rotational angle sensor 34 that detects a rotational angle of the motor 6, an axial force sensor 36 that detects a force that is applied to the piston 30 in the axial direction, and the like. That is, in the present embodiment of the disclosure, a pressing force as a force with which the piston 30 presses the brake pad 24in can be detected by the axial force sensor 36. Incidentally, in the present embodiment of the disclosure, it is not indispensable to provide the axial force sensor 36. For example, it is also possible to adopt a configuration in which a moving distance of the piston 30 is acquired based on the rotational angle of the motor 6 detected by the rotational angle sensor 34, and a pressing force as a force with which the piston 30 presses the brake pad 24in is estimated based on the moving distance of the piston 30.

The motor ECU 10 is equipped with a controller 40 that is mainly constituted of a computer. The controller 40 is configured to include an execution unit 40c, a storage unit 40m, an input-output unit 40i, and the like. The rotational angle sensor 34 and the axial force sensor 36 are connected to the controller 40. The motor 6 is connected to the controller 40 via a drive circuit 42. Besides, the drive circuit 42 is provided with a current sensor 44 that detects a current flowing through the motor 6. The current sensor 44 is also connected to the controller 40.

The brake ECU 4 is equipped with a controller 50 that is mainly constituted of a computer. The controller 50 is configured to include an execution unit 50c, a storage unit 50m, an input-output unit 50i, and the like. A brake switch 54 that detects whether or not a brake operation member 52 such as a brake pedal or the like is in an operation state, a stroke sensor 56 that detects an operation stroke of the brake operation member 52, an operation force sensor 58 that detects an operation force applied to the brake operation member 52 by the driver, and the like are connected to the controller 50.

<Actuation of Electric Brake Device>

In the present electric brake system configured as described above, when braking operation is performed by the driver and a brake actuation command is output to the brake device 10 from the brake ECU 4, a current is supplied to the motor 6. Thus, when the motor 6 is rotated in a positive direction, the piston 30 is moved forward, and the brake pad 24in is brought into abutment on the rotor 20. Besides, the brake pad 24out is pressed against the rotor 20 through the operation of the caliper 22 resulting from forward movement of the piston 30. That is, the rotor 20 is clamped by the pair of the brake pads 24in and 24out. Then, a braking force corresponding to a force with which the pair of the brake pads 24in and 24out are pressed against the rotor 20 is applied to the wheel, and the wheel is restrained from rotating.

On the other hand, when an operation of moving the brake operation member 52 backward is performed by the driver, the current supplied to the motor 6 is made small (or a reverse current is supplied thereto) to make the braking force small. When the motor 6 is rotated in a reverse direction, the pressing force of the piston 30 is made small. Then, the piston 30 is allowed to move backward, and the brake pads 24in and 24out are allowed to separate from the rotor 20. Incidentally, in the following description, the control of the electric brake device 2 in the case where the brake operation member 52 is moved backward will be omitted.

<Control of Electric Brake Device>

The control of the braking force will be briefly described. A target braking force of the vehicle is determined based on braking operation by the driver, and a target pressing force Fdref as a target of a force with which the piston 30 presses the brake pad 24in is determined based on the target braking force. Then, the energization current to the motor 6 is controlled such that a pressing force Fr acquired from a detection result of the axial force sensor 36 approaches the target pressing force Fdref.

Incidentally, for the control of the motor 6, a zero-point position as a position of the piston 30 where the braking force starts increasing, in other words, a contact start position as a position of the piston 30 where the brake pads 24in and 24out start coming into contact with the disc rotor 20 is used. For example, with a view to preventing the braking force from being generated with delay in starting braking operation, when the brake switch 54 turns ON, preparation control, namely, the control of moving the piston 30 to the zero-point position is performed. Then, when a brake actuation command is output to the electric brake device 10 after the piston 30 is moved to the zero-point position, pressing force control for making the pressing force Fr close to the target pressing force Fdref is performed.

When the brake switch 54 is ON, the brake ECU 4 acquires an operation stroke Sp of the brake operation member 52 and an operation force Fp of the brake operation member 52 from a detection result of the stroke sensor 56 and a detection result of the operation force sensor 58 respectively, and determines a target braking force Fref corresponding to each of the wheels based on at least one of the operation stroke Sp and the operation force Fp. Subsequently, the brake ECU 4 determines the target pressing force Fdref as a target of a force with which the piston 30 presses the brake pad 24in, based on the target braking force Fref. It should be noted, however, that although the target pressing force Fdref is made equal to the target braking force Fref in some cases, the target pressing force Fdref is made equal to a value obtained by subtracting a regenerative braking force Fe from the target braking force Fref (Fdref=Fref−Fe) when the target braking force Fref cannot be supplemented only by the regenerative braking force Fe (Fref>Fe), for example, in the case where regenerative cooperative control is performed. Then, when the target braking force Fref cannot be supplemented only by the regenerative braking force Fe, the brake ECU 4 outputs a brake actuation command for the brake device 2 to the motor ECU 10, and outputs the target pressing force Fdref to the motor ECU 10.

When the brake switch 54 is turned ON, the foregoing preparation control is performed in the motor ECU 10. Then, upon receiving the brake actuation command and the target pressing force Fdref from the brake ECU 4, the motor ECU 10 performs pressing force control subsequently to the preparation control. The motor ECU 10 acquires the actual pressing force Fr as a pressing force at the present from a detection result of the axial force sensor 36. A feedback component Ifb of the energization current to the motor 6 is determined based on a deviation $\Delta F$ between the target pressing force Fdref and the actual pressing force Fr.

In the present brake system, the output of the motor 6 is lost through friction until the rotor 20 is pressed by the brake pads 24in and 24out, namely, until the piston 30 and the caliper 22 operate via the decelerator 26 and the motion conversion mechanism 32. Then, the loss in the output of the motor 6 through friction differs depending on whether the loss is caused by dynamic friction in the case where the piston 30 actually moves forward or by static friction in the case where the stopped piston 30 is operated. That is, for a certain pressing force, the energization current to the motor 6 that is needed to prevent forward movement of the piston 30 from being stopped during forward movement of the piston 30, and the energization current to the motor 6 that is needed to move the stopped piston 30 forward are greatly different from each other in some cases.

Thus, the present brake system is configured to apply a forward movement continuation current as a current that is needed to prevent forward movement of the piston 30 from being stopped during forward movement of the above-mentioned piston 30 or a forward movement start current as a current that is needed to move the stopped piston 30 forward as well as a current of the previously determined feedback component to the motor 6. That is, the present brake system applies the forward movement continuation current or the forward movement start current as a feedforward component Iff. A method of determining the feedforward component Iff will be described hereinafter. Incidentally, in the present embodiment of the disclosure, only the case where the brake operation member 52 is depressed by the driver, namely, the case where the braking force is increased will be described.

In the present brake system, when determining an energization current Iref as a target energization current to the motor 6 for the target pressing force Fdref, it is first determined, based on a detection result of the rotational angle sensor 34 or the axial force sensor 36, whether or not the electric brake 8 is actually in operation, for example, whether or not the piston 30 moves forward, whether or not the motor 6 rotates, or the like. In concrete terms, the motor ECU 10 determines that the piston 30 moves forward when the rotational angle of the motor 6 detected by the rotational angle sensor 34 changes or when the actual pressing force Fr detected by the axial force sensor 36 changes, and determines that the piston 30 is stopped when neither the rotational angle of the motor 6 nor the actual pressing force Fr changes.

Figure 2:
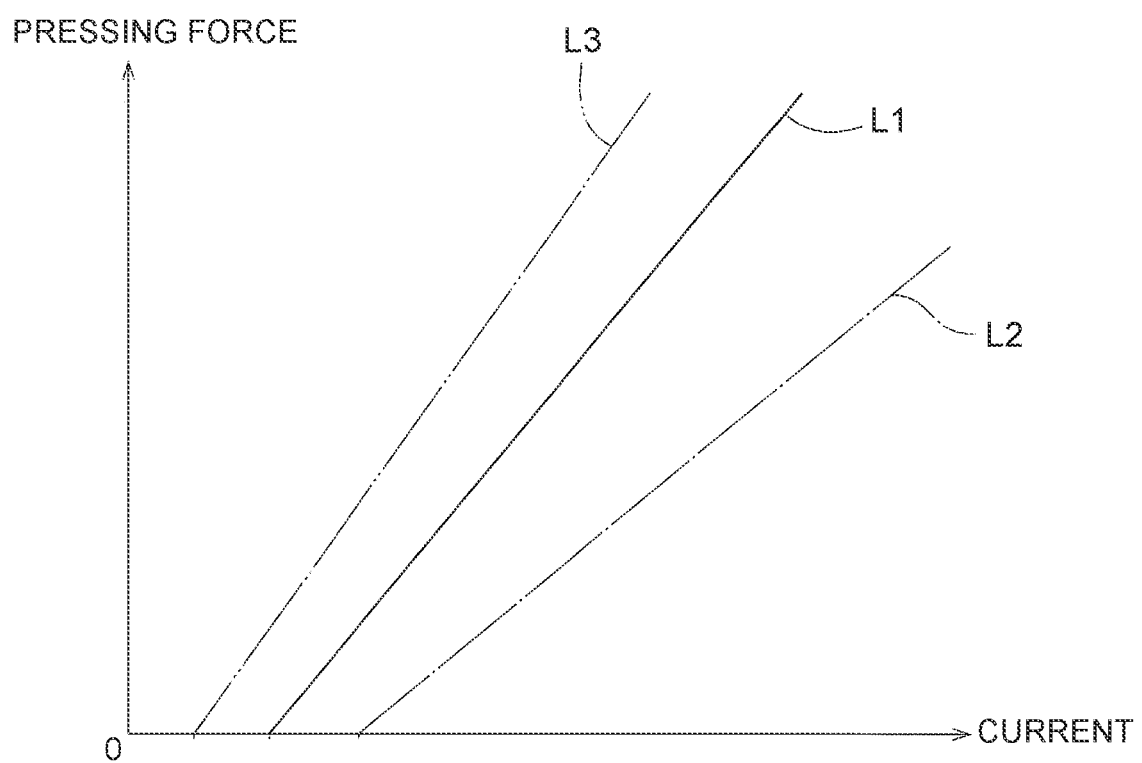
FIG. 2 is a view showing pressing force-current characteristics for use in the control of an electric brake system of FIG. 1.

When it is determined that the piston 30 moves forward, the motor ECU 10 determines the feedforward component Iff for the target pressing force Fdref based on first pressing force-current characteristics L1 as a relationship between the pressing force and the energization current to the motor 6 indicated by a solid line in FIG. 2, to apply the foregoing forward movement continuation current. Besides, when it is determined that the piston 30 is stopped, the motor ECU 10 determines the feedforward component Iff for the target pressing force Fdref based on second pressing force-current characteristics L2 indicated by an alternate long and short dash line in FIG. 2, to apply the foregoing forward movement start current. Then, the motor ECU 10 determines the target energization current Iref by adding the previously determined feedback component Ifb to the determined feedforward component.

Incidentally, when the actual pressing force Fr approaches the target pressing force Fdref, concretely, when the deviation $\Delta F$ becomes smaller than a set value $\Delta F_0$, the motor ECU 10 determines the feedforward component Iff based on third pressing force-current characteristics L3 indicated by an alternate long and two short dashes line in FIG. 2. These third pressing force-current characteristics L3 are set to stop the motor 6 from rotating, in other words, to stop the piston 30 from moving forward. That is, by determining the feedforward component Iff based on the third pressing force-current characteristics L3, the piston 30 is stopped at a position where the target pressing force Fdref is generated. Besides, these third pressing force-current characteristics can also be considered to be set to hold the piston 30 at a position where the piston 30 is stopped, depending on the magnitude of the reverse efficiency of the decelerator 26.

<Control Program>

Figure 3:
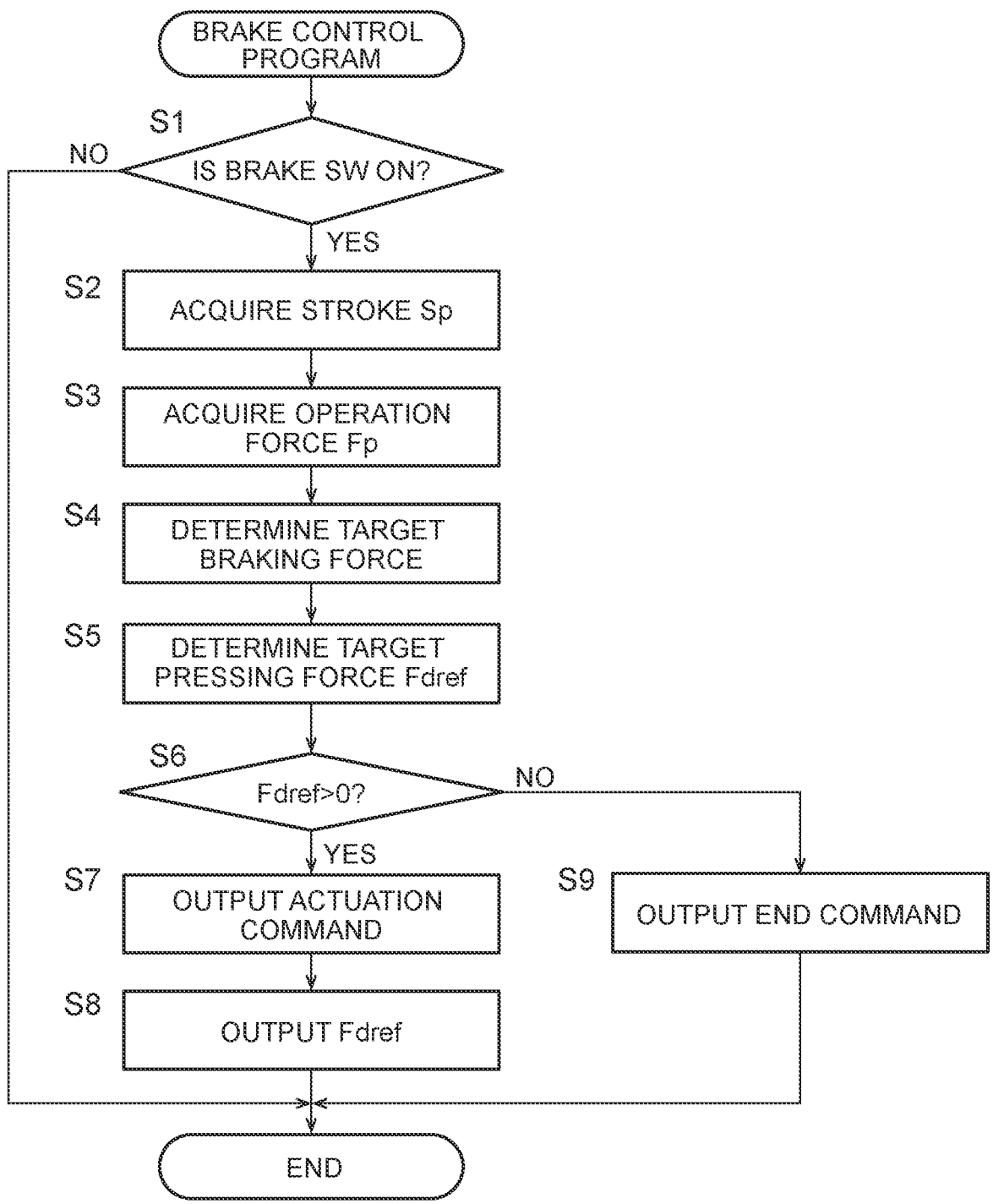
FIG. 3 is a view showing a flowchart of a brake control program that is executed by a brake ECU that takes charge of the control of the vehicular brake system of FIG. 1.

The aforementioned control of the braking force is performed through execution of a brake control program shown in a flowchart of FIG. 3 by the brake ECU 4. In the brake control program, firstly, in step 1 (hereinafter abbreviated as "S1" as is the case with the other steps), it is determined, based on a detection result of the brake switch 54, whether or not the brake operation member 52 has been operated. When the brake switch 54 is ON, the operation stroke Sp of the brake operation member 52 detected by the stroke sensor 56 and the operation force Fp of the brake operation member 52 detected by the operation force sensor 58 are acquired in S2 and S3 respectively. Then in S4, the target braking force Fref is determined based on at least one of the operation stroke Sp and the operation force Fp. In S5, the target pressing force Fdref is determined based on the target braking force.

Subsequently in S6, it is determined whether or not the target pressing force Fdref is larger than 0. If the target pressing force Fdref is larger than 0, a brake actuation command is output in S7, and the target pressing force Fdref is output in S8. On the other hand, if the target pressing force Fdref is equal to or smaller than 0, a brake end command is output in S9.

Figure 4:
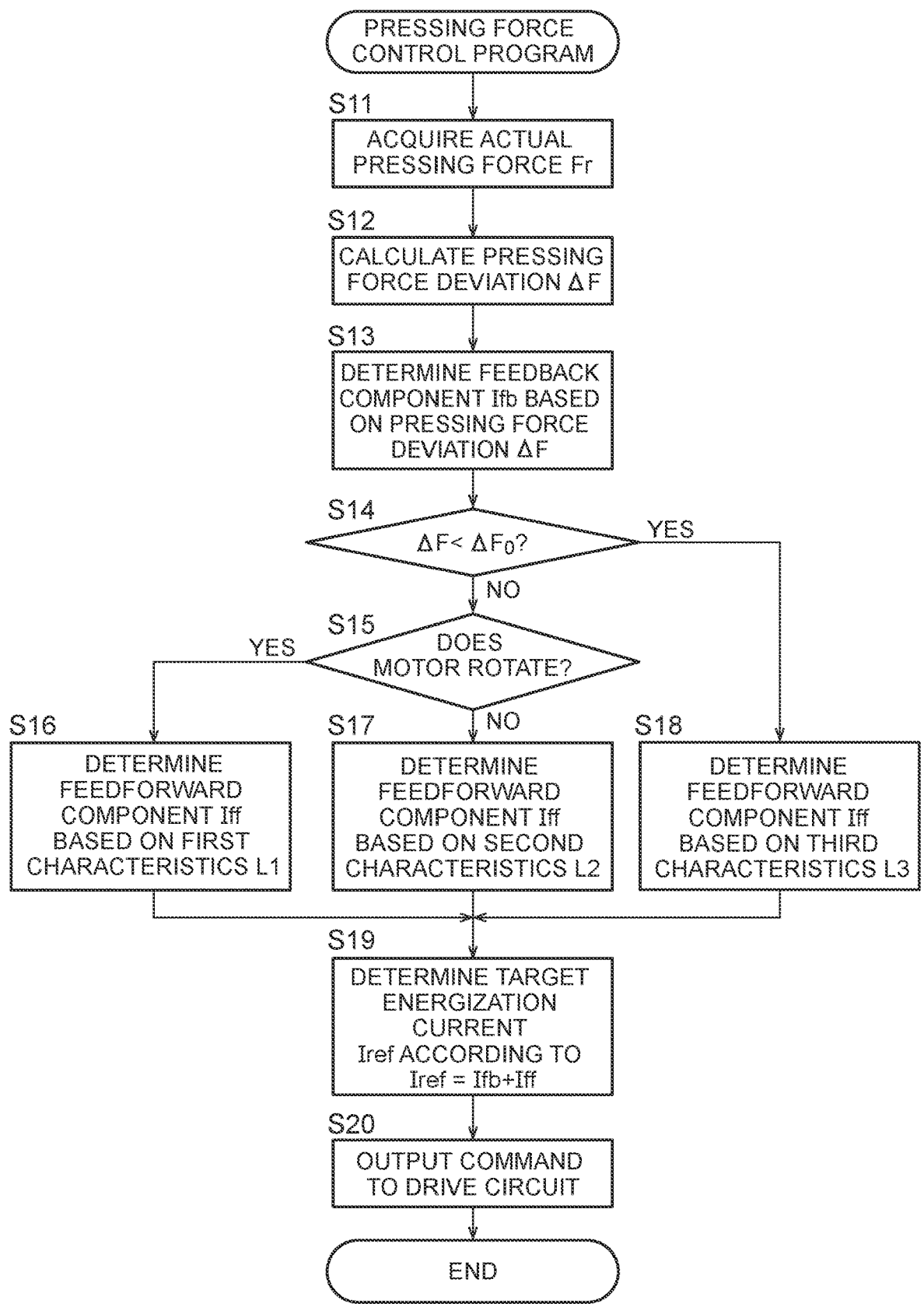
FIG. 4 is a view showing a flowchart of a pressing force control program that is executed by a motor ECU of FIG. 1.

When the brake switch is ON, the motor ECU 10 performs preparation control as the control for moving the piston 30 to the zero-point position. Upon receiving the brake actuation command from the brake ECU 4, the motor ECU 10 performs pressing force control through execution of a pressing force control program shown in a flowchart of FIG. 4.

In the pressing force control program, firstly, in S11, the actual pressing force Fr is acquired from a detection result of the axial force sensor 36. In S12, the deviation $\Delta F$ between the target pressing force Fdref and the actual pressing force Fr is calculated. Subsequently in S13, the feedback component Ifb of the energization current to the motor 6 is determined based on the pressing force deviation ΔF.

Then in S14, it is determined whether or not the actual pressing force Fr has approached the target pressing force Fdref, depending on whether or not the pressing force deviation ΔF is smaller than $\Delta F_0$. If the pressing force deviation ΔF is smaller than $\Delta F_0$, the feedforward component Iff is determined based on the third characteristics in S18. On the other hand, if the pressing force deviation ΔF is equal to or larger than $\Delta F_0$, it is determined in S15 whether or not the motor 6 rotates. If the motor 6 rotates, the feedforward component Iff is determined based on the first characteristics in S16. If the motor 6 is stopped, the feedforward component Iff is determined based on the second characteristics in S17.

When the feedforward component Iff is determined, the target energization current Iref is determined by summating the feedback component Ifb and the feedforward component Iff in S19. In S20, a command is issued to the drive circuit 42. Thus, the single execution of the pressing force control program is ended.

<Setting of Pressing Force-Current Characteristics>

Besides, the present brake system is configured to periodically update the above-mentioned three pressing force-current characteristics. For example, the pressing force-current characteristics are updated when a determined period elapses or when a determined distance is covered etc. after the setting of the characteristics. Incidentally, the pressing force-current characteristics are automatically updated when the vehicle is parked. A method of setting the three pressing force-current characteristics will be described hereinafter in detail.

(a) First Characteristic Setting Process

Figure 5:
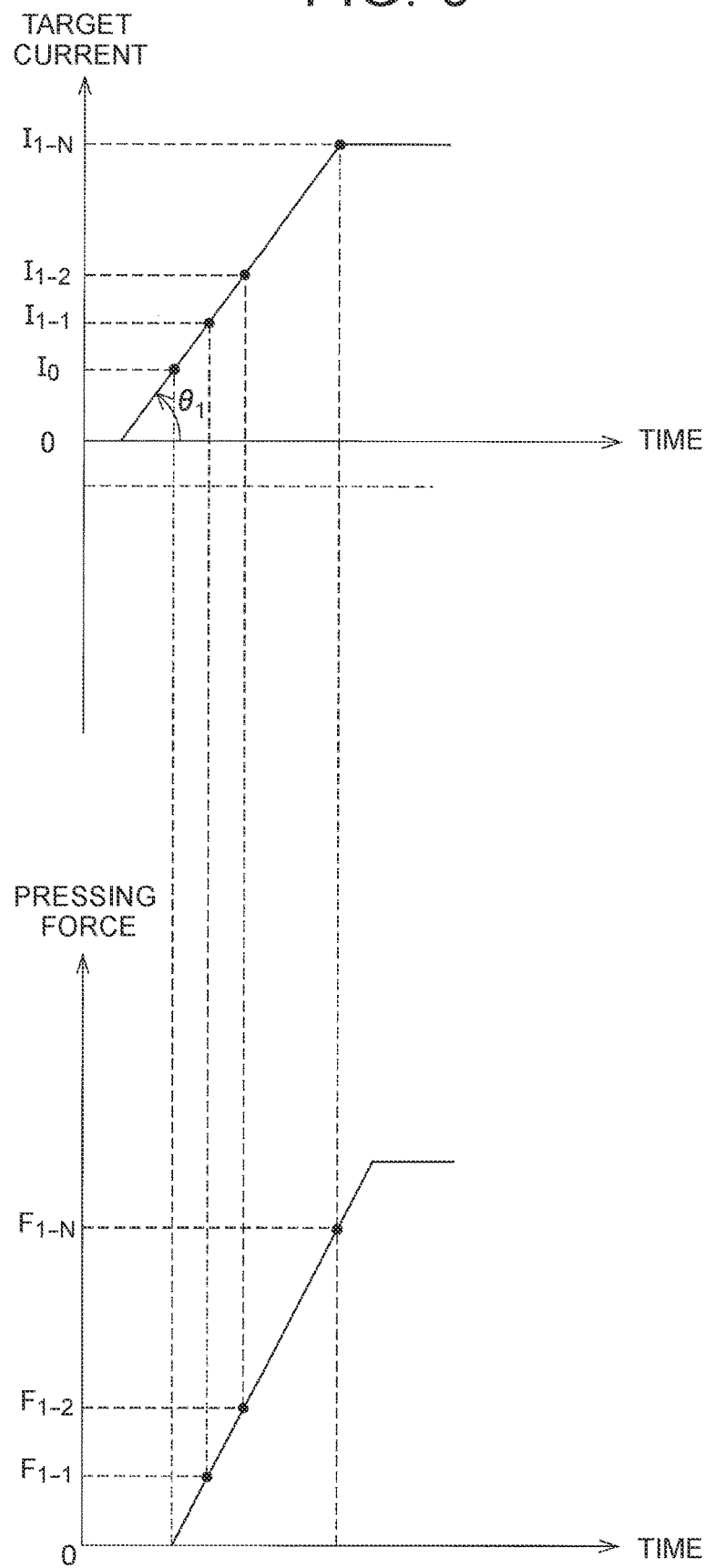
FIG. 5 is a view showing how a target energization current and a pressing force change with time in acquiring first pressing force-current characteristics.

First of all, the first pressing force-current characteristics L1 (referred to simply as "the first characteristics L1" in some cases in the following description) are set. As described previously, the first characteristics are set to prevent forward movement of the piston 30 from being stopped. In the present brake system, as shown in FIG. 5, while the piston 30 is moved forward by continuously increasing the energization current to the motor 6, a plurality of combinations of the energization current to the motor 6 and the pressing force corresponding to the energization current as samples of the first characteristics are acquired. To be more specific, the energization current to the motor 6 is increased at a relatively large time gradient $\theta_1$ to move the piston 30 forward, and a plurality of samples are acquired by the axial force sensor 36 and the current sensor 44 at intervals of a determined time while the piston 30 moves forward. Then, map data indicating the first characteristics are created based on the plurality of the acquired samples. The first characteristics are updated to the created map data.

(b) Second-Third Characteristic Setting Process

Figure 6:
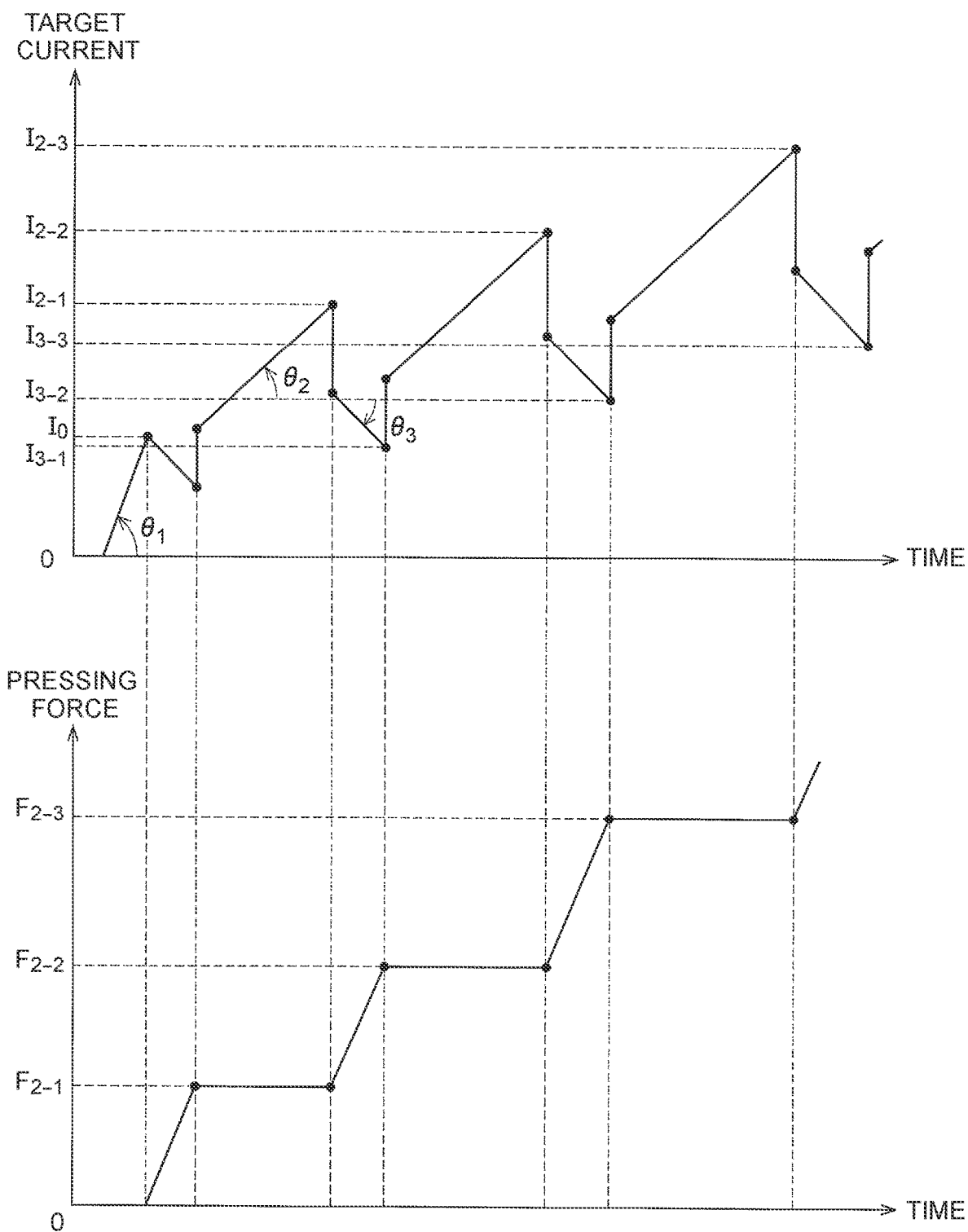
FIG. 6 is a view showing how the target energization current and the pressing force change with time in acquiring second pressing force-current characteristics and third pressing force-current characteristics.

When the first characteristics L1 are set, the second characteristics L2 and the third characteristics L3 are subsequently set. According to the second characteristics L2 and the third characteristics L3, as shown in FIG. 6, the energization current to the motor 6 is first increased at the time gradient $\theta_1$ to start forward movement of the piston 30. Then, when forward movement of the piston 30 is started, the energization current to the motor 6 is gradually reduced at a set time gradient $\theta_3$ immediately thereafter. When the energization current to the motor 6 is gradually reduced, forward movement of the piston 30 is stopped. Then, a sample of the third characteristics as a combination of the energization current and the pressing force at a time point when forward movement of the piston 30 is stopped is acquired.

When the piston 30 is stopped, the energization current to the motor 6 is increased. In this case, the energization current to the motor 6 is first increased at once to a magnitude that is determined based on the first characteristics for the pressing force at the present, and then is gradually increased at a set time gradient $\theta_2$. When the energization current to the motor 6 is gradually increased, the piston 30 starts moving forward. Then, a sample of the second characteristics as a combination of the energization current and the pressing force at a time point when the piston 30 starts moving forward is acquired.

When the piston 30 starts moving forward, the energization current to the motor 6 is reduced. In this case, the energization current to the motor 6 is first reduced at once to a magnitude that is determined based on the first characteristics for the pressing force at the present, and then is gradually reduced at the above-mentioned time gradient $\theta_3$. Then, a sample of the third characteristics is acquired again, and the energization current to the motor 6 is increased.

As described above, in the present brake system, while the increase and decrease in the energization current to the motor 6 are controlled as described above, a plurality of samples of the second characteristics and a plurality of samples of the third characteristics are acquired. Map data indicating the second characteristics are created based on the plurality of the samples of the second characteristics, and map data indicating the third characteristics are created based on the plurality of the samples of the third characteristics. The second characteristics and the third characteristics are updated to the created map data respectively.

<Features of Electric Brake System>

Figure 7:
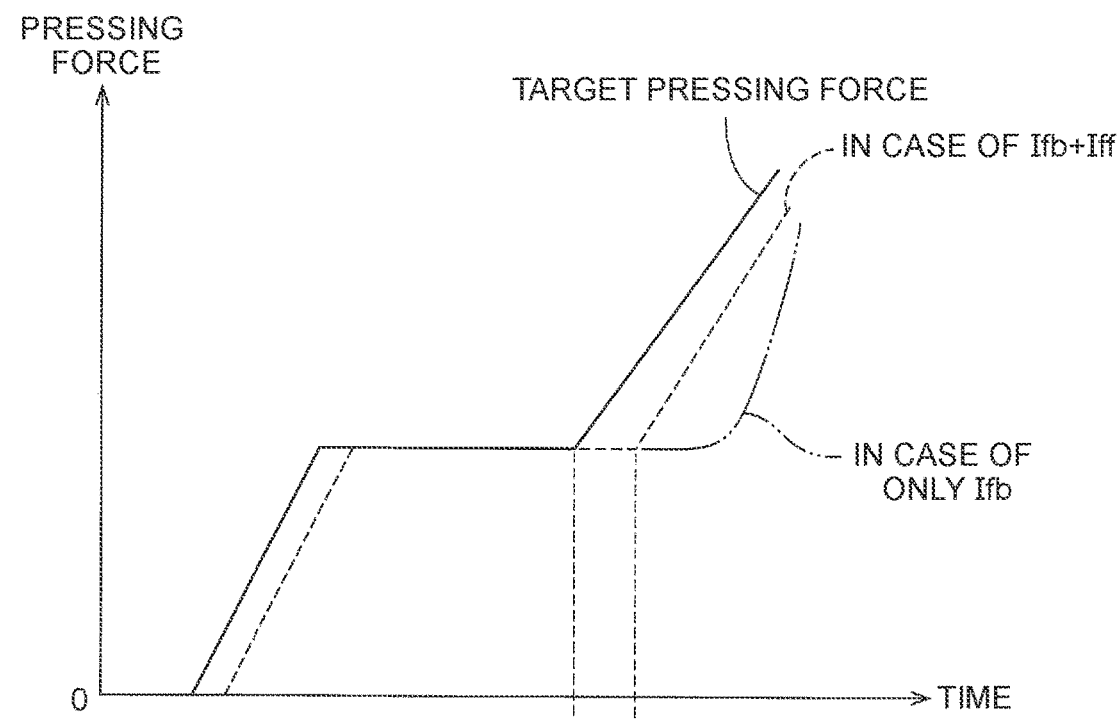
FIG. 7 is a view showing how a feedforward component and the pressing force change with time when pressing force control is performed in the present electric brake system.
Figure 7:
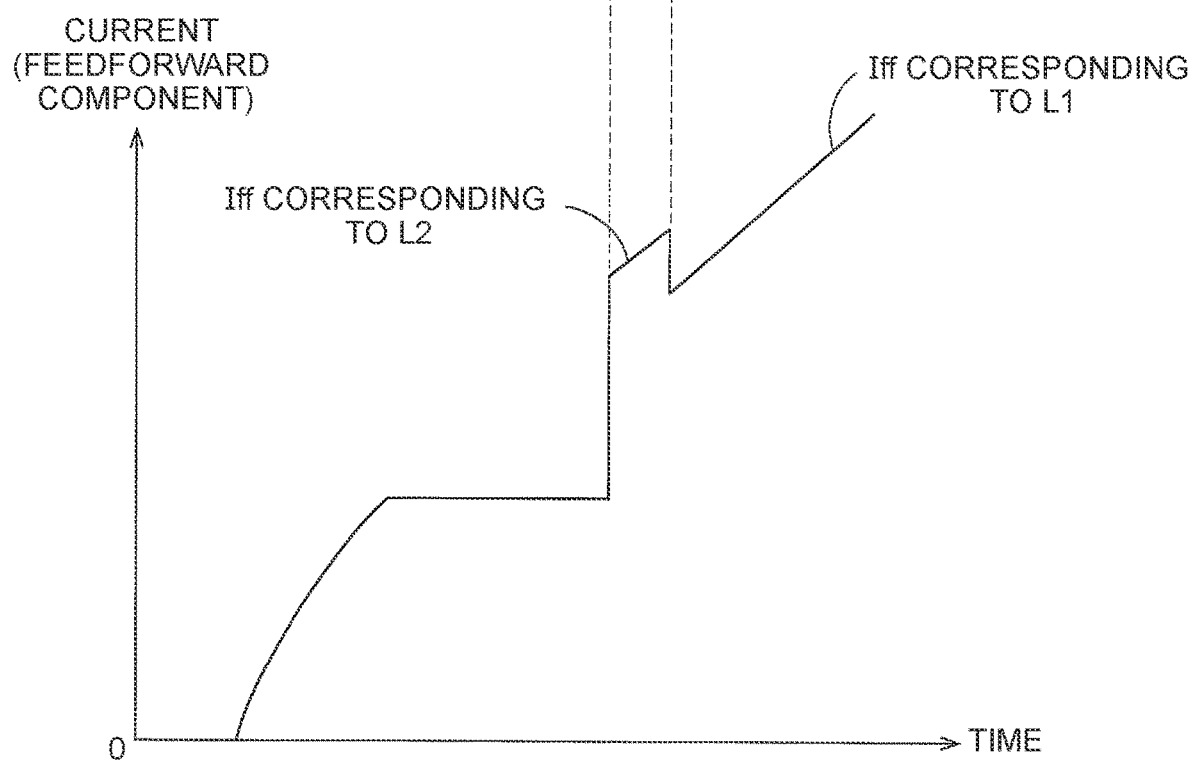

In the present electric brake system configured as described above, the feedforward component Iff of the energization current to the motor is controlled through the use of the first pressing force-current characteristics L1 that take dynamic friction into account, and the second pressing force-current characteristics L2 that take static friction into account. Therefore, for example, when the target energization current Iref is determined only by the feedback component Ifb, the target energization current does not become large until the pressing force deviation ΔF becomes large, as shown in FIG. 7. As a result, the pressing force may rise with delay, and the braking force may also rise with delay. In the present electric brake system, the target energization current Iref is determined by adding the feedforward component Iff to the feedback component Ifb, so the rise in the braking force can be restrained from being delayed. Besides, in the electric brake system according to the present embodiment of the disclosure, a relatively large current that takes static friction into account is applied based on the second characteristics L2 when the stopped piston 30 is moved forward, as shown in FIG. 7. Therefore, the responsiveness of the braking force to braking operation can be ensured. Furthermore, when the piston 30 moves forward, a current having a magnitude that does not stop the piston 30 through dynamic friction is applied based on the first characteristics L1, so the braking force can be reliably increased in accordance with braking operation. In consequence, according to the present electric brake system, both static friction and dynamic friction can be coped with through a simple method of changing over the pressing force-current characteristics in controlling the energization current to the motor 6.

Besides, the foregoing method of setting the pressing force-current characteristics utilizes the first characteristics L1 in setting the second characteristics L2 and the third characteristics L3, and thereby makes it possible to shorten the time in which the energization current to the motor 6 is gradually increased and hence also to lessen the amount of rise in the pressing force while the energization current is gradually increased. In consequence, according to the present method of setting the pressing force-current characteristics, the number of samples of the second characteristics and the third characteristics can be increased. Besides, with a view to setting the third characteristics L3 as well as the second characteristics L2, the energization current to the motor 6 is reduced after the piston 30 starts moving forward. Therefore, the number of samples of the second characteristics and the third characteristics can be further increased. In consequence, according to the present method of setting the pressing force-current characteristics, a large number of samples can be efficiently acquired. Therefore, the characteristics set from a large number of samples are highly reliable.

Incidentally, the present method of setting the pressing force-current characteristics is used in updating the pressing force-current characteristics that are utilized in the electric brake system, but can also be used in initially setting the pressing force-current characteristics.

What is claimed is:

1. An electric brake system comprising:
   an electric brake device including a friction member, a rotating body that is configured to rotate together with a wheel, a motor as a motive power source, and a driven member that is driven by the motor, the electric brake device being configured to generate a braking force by pressing the friction member against the rotating body through forward movement of the driven member; and
   an electronic control unit (ECU) programmed to control the braking force that is generated by the electric brake device by controlling the motor, wherein
   in a case where a relationship between a pressing force as a force with which the friction member presses the rotating body and an energization current to the motor is defined as pressing force-current characteristics, the ECU is programmed to:
      apply, to the motor, a current whose magnitude corresponds to first pressing force-current characteristics set to prevent forward movement of the driven member from being stopped, and
      apply, to the motor, a current whose magnitude corresponds to second pressing force-current characteristics set to move the driven member forward that is in a stopped state.

2. The electric brake system according to claim 1, wherein the ECU is programmed to determine a target energization current as a target of the energization current to the motor, by summating a component of the energization current to the motor that is determined based on the first pressing force-current characteristics or the second pressing force-current characteristics and a component of the energization current to the motor for making the pressing force closer to a target pressing force determined based on braking operation by a driver.

3. The electric brake system according to claim 1, wherein the motor is a rotary motor, and
   the electric brake device has a decelerator configured to decelerate rotation of the motor, and a motion conversion mechanism configured to convert rotation of an output shaft of the decelerator into rectilinear motion and output the rectilinear motion to the driven member.

4. The electric brake system according to claim 1, wherein the first pressing force-current characteristics are set based on a plurality of first samples acquired during continuous forward movement of the driven member as a result of continuous increases in the energization current to the motor, and
   each of the plurality of first samples is a sample of the pressing force-current characteristics as a combination of the energization current and the pressing force corresponding to the energization current.

5. The electric brake system according to claim 1, wherein the second pressing force-current characteristics are set based on a plurality of second samples acquired with the pressing force assuming different values respectively and with the driven member stopped, and
   each of the plurality of second samples is a combination of the energization current of the motor acquired at a time point of start of forward movement of the driven member as a result of an increase in the energization current to the motor from the state where the driven member is stopped and the pressing force corresponding to the energization current.

6. The electric brake system according to claim 1, wherein the ECU is further programmed to set the first pressing force-current characteristics, and set the second pressing force-current characteristics.

7. The electric brake system according to claim 6, wherein the ECU is further programmed to acquire a plurality of first samples of the first pressing force-current characteristics as a combination of the energization current to the motor and the pressing force corresponding to the energization current while continuously increasing the energization current to the motor, and set the first pressing force-current characteristics based on the plurality of the first samples.

8. The electric brake system according to claim 6, wherein the ECU is further programmed to:
   acquire an initial second sample of the second pressing force-current characteristics as a combination of the energization current to the motor and the pressing force corresponding to the energization current at a time point of start of forward movement of the driven member as a result of an increase in the energization current to the motor from the state where the driven member is stopped,
   after acquiring the initial second sample, acquire a plurality of second samples in which the pressing force assumes different values respectively with the driven member stopped, by repeatedly reducing the energization current to the motor and stopping the driven member, and
   set the second pressing force-current characteristics based on the initial second sample and the plurality of the second samples.

9. The electric brake system according to claim 8, wherein the ECU is further programmed to increase the energization current to the motor to a magnitude that is acquired based on the first pressing force-current characteristics for the pressing force at a time point of stop of the driven member after stop of the driven member, and then gradually increase the energization current to the motor.

10. A method of setting pressing force-current characteristics in which first pressing force-current characteristics and second pressing force-current characteristics in an electric brake system are set, wherein the electric brake system includes: an electric brake device including a friction member, a rotating body that is configured to rotate together with a wheel, a motor as a motive power source, and a driven member that is driven by the motor, the electric brake device being configured to generate a braking force by pressing the friction member against the rotating body through forward movement of the driven member, and an electronic control unit (ECU) programmed to Control the braking force that is generated by the electric brake device by controlling the motor, wherein in a case where a relationship between a pressing force as a force with which the friction member presses the rotating body and an energization current to the motor is defined as pressing force-current characteristics, the ECU is programmed to:

applying, to the motor, a current whose magnitude corresponds to first pressing force-current characteristics set to prevent forward movement of the driven member from being stopped when the driven member moves forward, and applying, to the motor, a current whose magnitude corresponds to second pressing force-current characteristics set to move the driven member in a stopped state forward when the driven member is stopped, the method comprising:

a first characteristic setting process that includes acquiring a plurality of first samples of the first pressing force-current characteristics as a combination of the energization current to the motor and the pressing force corresponding to the energization current while continuously increasing the energization current to the motor, and setting the first pressing force-current characteristics based on the plurality of the first samples; and a second characteristic setting process that includes acquiring an initial second sample of the second pressing force-current characteristics as a combination of the energization current to the motor and the pressing force corresponding to the energization current at a time point of start of forward movement of the driven member as a result of an increase in the energization current to the motor from the state where the driven member is stopped, acquiring a plurality of second samples in which the pressing force assumes different values respectively with the driven member stopped by repeatedly reducing the energization current to the motor and stopping the driven member, and setting the second pressing force-current characteristics based on the initial second sample and the plurality of the second samples, wherein the second characteristic setting process includes increasing the energization current to the motor to a magnitude that is acquired based on the first pressing force-current characteristics for the pressing force at a time point of stop of the driven member, and then gradually increasing the energization current to the motor.

* * * * *